Dec. 9, 1952 F. G. MENZE Re. 23,595

COUNTING ATTACHMENT FOR SCALES

Original Filed Jan. 23, 1948

Inventor:
Frank George Menze
By: Archibald D. McKellar
Attorney.

Reissued Dec. 9, 1952

Re. 23,595

UNITED STATES PATENT OFFICE 23,595

COUNTING ATTACHMENT FOR SCALES

Frank George Menze, Chicago, Ill.

Original No. 2,524,202, dated October 3, 1950, Serial No. 4,025, January 23, 1948. Application for reissue September 29, 1951, Serial No. 248,991

5 Claims. (Cl. 265—30)

Matter enclosed in heavy brackets [ ] appears in the original patent but forms no part of this reissue specification; matter printed in italics indicates the additions made by reissue.

The invention relates to new and useful improvements in scales but more particularly to scale beams having an auxiliary of parallel beams arranged in co-operative position with the sliding poise, and more particularly to a device of this kind which may be attached to a conventional scale beam in position to co-operate therewith and has for its objects the provision of a device of this character which is simple of construction, economical to manufacture, and highly efficient in use.

Other objects will appear hereinafter.

The invention consists in the combinations and arrangements of parts hereinafter described and claimed. This invention will be best understood by reference to the accompanying drawing forming a part of this specification and in which:

Figure 1:
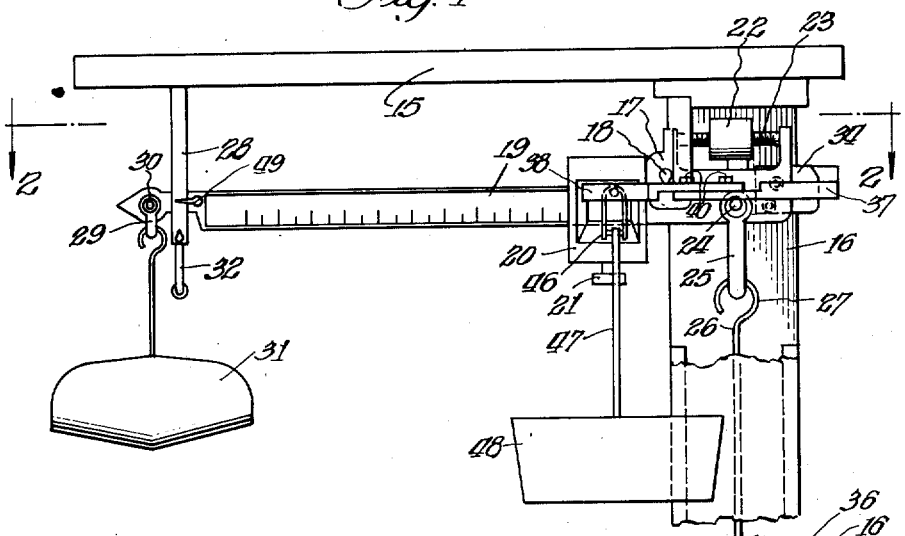
Figure 1 is a side elevation of a platform scale head equipped with an attachment embodying the invention in position for use.
Figure 2:
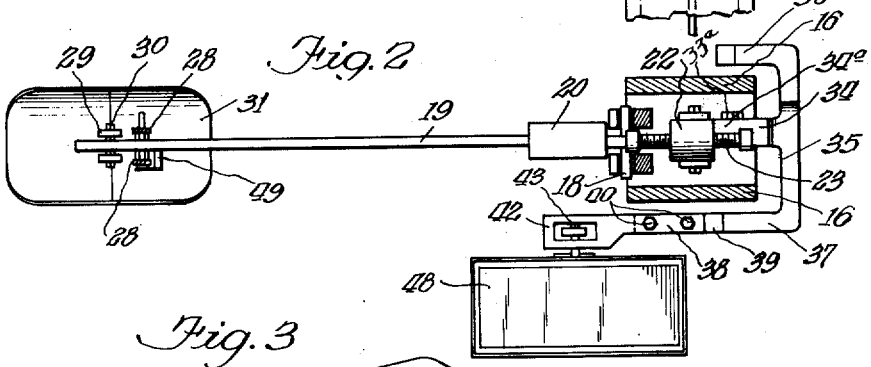
Figure 2 is a plane view taken on the line 2—2 of Figure 1.

A practical embodiment of the invention in the drawings comprises the head 15 of a platform scale mounted at the top of conventional steelyard housing 16. A fulcrum bearing 17 is attached to the upper part of the steelyard housing 16 and below the head 15 in position to operatively receive a knife-edge pivot 18 attached to a conventional scale beam 19 intermediate its ends. A sliding poise 20 is arranged on the beam 19 and carries a clamping screw 21 which serves the purpose of holding the said poise 20 in a selected position on said beam 19.

A balance ball 22 is adjustably carried by a threaded shaft 23 at the inner end of the beam 19 which is of a conventional type and serves the purpose of setting the beam 19 in balanced relation, as will be readily understood. Arranged below the balance ball 22 and attached to the beam 19 is load pivot 24 from which is suspended a bearing loop 25 which in turn supports a steelyard rod 26 by a hooked end 27 thereof.

The outer end of the beam 19 is projected through a slotted guard frame 28 provided with a beam latch 32 for holding the said beam 19 in inoperative position, and a counterpoise loop 29, hung from a tip pivot 30, from which is suspended a scoop holder 31.

The beam 19 is further provided at its inner end with an auxiliary unit 33 having a centrally placed lug 34 with a flange 34a which is removably attached by cap screws 33a projecting *through openings 33c located* forwardly from a cross bar 35.

The cross bar 35 extends outwardly in one direction from said lug 34 past the steelyard housing 16 and then forwardly in alignment with the beam 19 and *when in position on the beam 19* serves as a horizontal counterweight 36 [in position] the other end of the cross bar 35 extends in the opposite direction past the other side of the steelyard housing 16 and then forwardly in alignment with the beam 19 and serves as an auxiliary beam 37. The auxiliary beam 37 is in two parts, one integral with the cross bar 35 and the other part serves as an adjustable extension beam 38. The extension beam 38 is attached to the auxiliary beam 37 by a lap joint 39, held by suitable cap screws 40—40 inserted in slots 41—41 and adjustably held to the auxiliary beam 37 thereby. The outer end of the extension beam 38 is provided with a vertically aligned hole 42 having pin 43 inserted through the side wall 44 and 45. The pin 43 carries a U-shaped yoke 46 attached to the upper end of a rod 47 to the bottom of which is attached a basket or pan 48.

Figure 3:
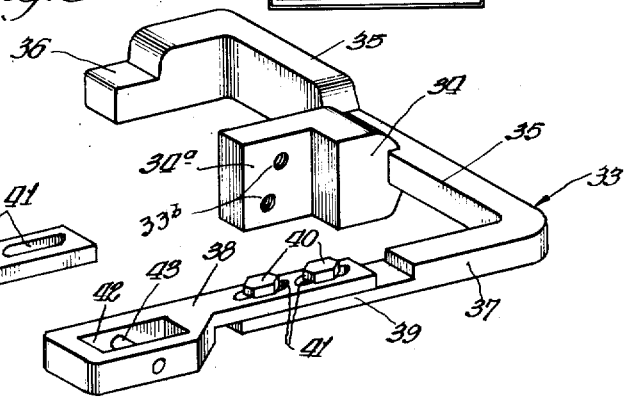
Figure 3 is a perspective view of the device apart from the conventional scale beam.
Figure 4:
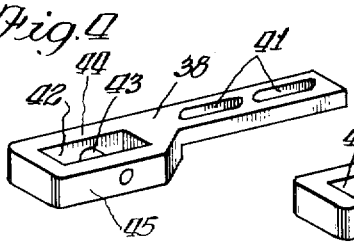
Figure 4 is a perspective view of an adjustable beam arm.

The auxiliary unit 33 can be attached to the beam of any conventional platform scale by suitable cap screws fitted into threaded holes in the regular beam 19 and brought into balance by use of the balance ball 22, as will be readily understood. An auxiliary beam 37 is provided with an adjustable extension beam 38 held by suitable cap screws 40 attached to the auxiliary beam 37. By the arrangement of these screws and with the beam 19 in balance the whole assembly can again be brought into balance by the adjustment of the auxiliary beam 37 to the extension beam 38 as best shown in Fig. 3.

The extension beam 38 is provided with a pin 43 adapted to receive the hooked end of the rod 47 which in turn carries a basket 48. If it is desired to use the scale as a counting mechanism the extension beam 38 is set by placing one piece in the basket 48 and with ten pieces placed on the platform of the scale (not shown in the drawing) and brought into balance, and if the beam 19 is graduated for a 100 to 1 ratio the ten pieces may be placed in the scoop holder 31 which will serve as a weight which would balance 100 times 10 or 1,000 pieces on the platform. Other similar arrangements can be made along the same lines and can be readily adapted to estimate the number of gross in a given lot. Other adaptions of the use of the scale as an estimating device by varying the ratio of parts on the scale to those serving as weights on the beam will readily suggest themselves when in use.

With the use of the auxiliary beam 37 with its attendant extension beam 38 other multiples can be readily arranged.

While I have illustrated and described the details of a practical embodiment of my invention, these may be modified, altered, re-arranged, and otherwise changed without departing from the described innovations herein; I, therefore, do not wish to be limited to the precise details set forth, but seek to avail myself of such variations, modifications and changes as may fall within the spirit and scope of the appended claims.

I claim:

1. A counting attachment for scales comprising in combination a pivotally mounted graduated scale beam with an integral body of substantially U-shape having a cross bar portion at right angles to the graduated scale beam; a forwardly projecting elongated counterweight at one end of said cross bar portion; a forwardly projecting auxiliary beam at the opposite end of said cross bar portion; a forwardly projecting lug arranged intermediate said elongated counterweight and said auxiliary beam; a shoulder on said lug abutted to the inner end of said graduated scale beam; screw means for mechanically connecting said flange to the inner end of said graduated beam.

2. In combination with a horizontal scale beam of a counting unit comprising an outwardly extending cross bar at right angles to said horizontal scale beam; a forwardly extending auxiliary beam at the outer end of said cross bar in spaced and parallel relation with said horizontal scale beam; a forwardly extending lug at the inner portion of said cross bar; a forwardly extending half joint flange in vertical alignment with one vertical side of said horizontal scale beam; screw means for mechanically securing said flange and said lug in abutted position with the inner end of said scale beam: a forwardly and horizontally extensible end beam connected by half joint laps secured by mechanical screw means to said auxiliary beam; a vertically placed eye in the outer end of said extensible end beam in which a hook engaging pin is centrally and horizontally secured; there being elongated holes adjacent the inner end of said extensible end beam.

*3. A counting attachment for use with a scale having a pivotally mounted scale beam, comprising an integral body having a cross bar portion adapted to be arranged at right angles to the scale beam at the inner end thereof, a counterweight at one end of said cross bar portion, an auxiliary beam portion at the other end of said cross bar portion and extending forwardly thereof so as to be positioned alongside of and spaced from the scale beam, an attaching lug on said cross bar portion between said counterweight and said auxiliary beam and extending forwardly of said cross bar portion, and means for connecting said lug to the inner end of the scale beam.*

*4. A counting attachment for use with a scale having a pivotally mounted scale beam, comprising an integral body having a cross bar portion adapted to be arranged at right angles to the inner end of the scale beam, a counterweight at one end of said cross bar portion, an auxiliary beam portion at the other end of said cross bar portion and extending forwardly thereof so as to be positioned alongside of and spaced from the scale beam, means carried at the outer end of said auxiliary beam for mounting a scale pan for pivotal movement on an axis perpendicular to the plane of pivotal movement of the scale beam, an attaching lug on said cross bar portion between said counterweight and said auxiliary beam and extending forwardly of said cross bar portion to lie against one face of the scale beam, and means for mechanically connecting said lug to the inner end of the scale beam.*

*5. A counting attachment for use with a scale having a pivotally mounted scale beam, comprising an integral body having a cross bar portion adapted to be arranged across one end of the scale beam, a counterweight at one end of said cross bar portion, an auxiliary beam portion at the other end of said cross bar portion extending forwardly thereof so as to be positioned alongside of and spaced from the scale beam, means for pivotally suspending a pan from the outer end of said auxiliary beam, and means on said cross bar portion between said counterweight and said auxiliary beam for connecting said cross bar portion to said one end of the scale beam.*

FRANK GEORGE MENZE.

REFERENCES CITED

The following references are of record in the file of this patent or the original patent:

UNITED STATES PATENTS

| Number | Name | Date |
|---|---|---|
| 1,309,602 | Brophy | July 8, 1919 |
| 1,330,593 | King | Feb. 10, 1920 |
| 1,715,832 | Hapgood | June 4, 1929 |
| 1,741,416 | Hem | Dec. 31, 1929 |
| 2,250,294 | Corliss | July 22, 1941 |
| 2,407,435 | McCulloch | Sept. 10, 1946 |
| 2,484,324 | Thorsson | Oct. 11, 1949 |
| 2,516,046 | Cousineau | July 18, 1950 |

FOREIGN PATENTS

| Number | Country | Date |
|---|---|---|
| 327,920 | Great Britain | Apr. 17, 1930 |